Patented Jan. 11, 1927.

1,614,195

UNITED STATES PATENT OFFICE.

ALFRED HÄUSSLER, OF NIEDER-INGELHEIM-ON-THE-RHINE, GERMANY, ASSIGNOR TO THE FIRM OF C. H. BOEHRINGER & SOHN, CHEMISCHE FABRIK, OF NIEDER-INGELHEIM-ON-THE-RHINE, GERMANY, A GERMAN SOCIETY.

PROCESS FOR THE MANUFACTURE OF ESTERS OF OXY-ACIDS.

No Drawing. Application filed February 20, 1925, Serial No. 10,682, and in Germany March 5, 1923.

According to the invention esters of oxy-acids are produced by the action of oxygen and the corresponding hydroxy acids when these latter are in a volatilized state.

The oxy-acids referred to in the present invention are to be understood to imply aldehydic and ketonic acids having the general formula:—

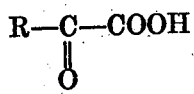

where R is either hydrocarbon radicle or an atom of hydrogen.

In carrying the process into practice, the hydroxy acids serving as parent materials such as for example lactic acid, glycollic acid, and hydroxy-butyric acid, malic acid, tartaric acid, and so on, are first converted into the corresponding esters of these acids. Afterwards they are dehydrogenated in a vaporized state by the action of oxygen which advantageously may be employed in the form of an oxygen-containing gas, for example air or a gaseous mixture of oxygen and ozone, or may be supplied by substances yielding oxygen, for example, metallic oxides on heating over which the vaporized ester mixture is passed. During the dehydrogenation oxy-acid esters are formed by the conversion of the alcohol group into the carbonyl group. Advantageously, the process is performed without detriment to the reaction in the presence of vapours, for example steam, with the aid of which the temperature and the speed of the reaction can be controlled so that a violent or explosive reaction is avoided with safety.

If necessary, the process especially the dehydrogenation, can be performed with oxygen in the presence of contact substances; for such purposes oxy-compounds may be used which are derived from highly oxidized metals. Particularly effective are oxides of an acid character in the free form, or combined as salts.

Good results are obtained for example by employing the following kinds of catalysts:—Vanadium pentoxide, molybdenum trioxide, uranium oxide, copper- and silver vanadates, molybdates, uranates, lead chromate, nickel chromate, and so on.

Furthermore, ferric oxide, nickel and cobalt oxide, the oxides of manganese, copper oxide, the oxides of the rare earths and others may also be employed as catalysts.

In some cases it is advantageous to use more than one catalyst, for example mixtures of several catalysts. The catalysts can be activated by the addition of certain substances which have no catalytic action of their own. They may be employed upon porous carrying substances such as pumice stone, unglazed china, asbestos and the like, but also spread upon metals with rough surfaces for example aluminium, iron, copper, etc.

The reaction starts apparently at ordinary temperature or at temperatures below 100° C. The process, however, is preferably carried on at elevated temperatures for example between 100° and 500° C. Excellent yields are obtained generally by working between 200 and 400° C. When the lactic acid esters of the aliphatic alcohols for example are used as starting material in accordance with the present process it was found that working at about 250–350° C. yielded particularly good results. The process may be carried through at ordinary or at increased pressure, or even in a vacuum. Generally speaking, it is best to suit the pressure to be used to the sensitiveness of the esters utilized in such a way that very sensitive esters are treated in a vacuo, for less sensitive esters on the other hand increased pressure is used.

In order to avoid the saponification of such esters as are, especially easily saponified by the water formed during the reaction it is advisable but not essential to provide for the presence of agents combining with or fixing the water formed, as it was noticed that even in the absence of such means the oxidizing process can be carried through without being disturbed to any extent by the saponification process.

By way of illustration we give the following examples to show how we wish our new process to be carried into practice.

*Examples:*

1. The vapours of lactic ester in mixture with oxygen are passed at atmospheric or at a slightly increased pressure through a tube with a length of ten meters and an interior width of 2-4 centimeters, at a moderate speed. Pyroracemic acid ester is obtained with a yield of 60 per cent of the theoretical.

2. 120 grams of the ethylester of lactic acid in the vaporous form are passed over 400 grams of vanadium pentoxide at 250° C. About 70 grams of a distillate results containing 70 per cent of the pyroracemic ethyl ester.

3. 100 grams of lactic ethylester or methylester in the form of vapours are mixed with an excess of oxygen, amounting to four to six times the quantity required by theory. The mixture is conducted over vanadium pentoxide at a temperature corresponding to the boiling point of the respective ester. 95 to 100 grams of distillate are obtained, containing 30 to 40 percent of the ester of the pyroracemic acid.

4. A mixture of the vapours of lactic methyl ester or ethyl ester with oxygen, air or a mixture of carbon dioxide and oxygen in equal parts is passed through a pipe heated to 250-255° C. and charged with vanadium pentoxide which has been precipitated upon pumice stone. The vapours obtained are cooled. The condensate contains, according to the conditions under which the process has been carried on, 60 to 70% of pyroracemic methyl ester or ethyl ester respectively in addition to a few percent of unconverted lactic acid ester and free pyroracemic acid. The remainder consists of water formed by the reaction. The pyroracemic acid can be obtained in a pure state by direct fractional distillation, but can if desired, be previously salted out, and yields 60 to 70% of the theory.

5. The vapours of glycollic ethyl ester are mixed with air and the mixture is passed at a pressure of one and a half to two atmospheres through a tube charged with silver or copper vanadate and heated to 200-250° C. The working up of the product obtained and containing more than 50 percent of glyoxylic ethylester proceeds on the lines described above.

6. The vapours of tartaric diethylester are mixed with oxygen and the mixture is passed at 300° C. and at a pressure of 60 millimeters over pieces of unglazed china which are coated with the oxides of vanadium or uranium, or over pieces of sheet aluminium treated in the same way. The condensate contains 50-60 percent diketo succinic diethylester besides a small quantity of ketomalonic diethylester.

In the same or a similar manner other oxy acid esters may be prepared, for example glyoxylic butylester from glycollic butylester, pyroracemic amylester from lactic amylester, α-keto butyric ester from α-hydroxybutyric ester, oxalacetic diethylester from malic diethyl ester, etc. The oxy acids themselves are prepared by saponifying the esters thus gained. The invention, therefore, makes it possible to arrive at the valuable oxyacids and their esters in the simplest way by starting from the corresponding hydroxyacids.

Having now particularly described my new invention and the way in which it is executed, what I claim is—

1. Process for the manufacture of esters of oxyacids which consists in volatilizing the esters of hydroxy acids and subsequently dehydrogenating the vapours so produced by the action of oxygen.

2. Process for the manufacture of esters of oxyacids which consists in converting the hydroxy acids into the corresponding volatilizable esters, and subsequently dehydrogenating the latter in a vapourized form by the action of oxygen.

3. Process for the manufacture of esters of oxyacids which consists in volatilizing the esters of hydroxy acids and subsequently dehydrogenating the same by means of oxygen-containing gaseous mixtures.

4. Process for the manufacture of esters of oxyacids which consists in converting the hydroxy acids into the corresponding vaporizable esters and subsequently dehydrogenating the latter in a vaporized state by the action oxygen-containing gaseous mixtures.

5. Process for the manufacture of esters of oxyacids which consists in volatilizing the esters of the hydroxy acids and subsequently dehydrogenating the same by the action of gaseous mixture containing oxygen and ozone.

6. Process for the manufacture of esters of oxyacids which consists in converting the hydroxy acids into the corresponding volatilizable esters and subsequently dehydrogenating the latter in a vaporized state by the action of gaseous mixture containing oxygen and ozone.

7. Process for the manufacture of esters of oxyacids which consists in volatilizing the esters of hydroxy acids and subsequently dehydrogenating the latter by the action of air containing ozone.

8. Process for the manufacture of esters of oxy acids which consists in volatilizing the esters of hydroxy acids and subsequently dehydrogenating the same by the action of oxygen in the presence of injected steam.

9. Process for the manufacture of esters of oxy acids which consists in vaporizing the esters of hydroxy acids and subsequently dehydrogenating the latter by means of gaseous mixture containing oxygen in the presence of injected steam.

10. Process for the manufacture of esters of oxy acids which consists in vaporizing the esters of hydroxy acids and subsequently dehydrogenating the same by the action of oxygen in the presence of catalytically reacting oxygen compounds which are derived from highly oxidized metals.

11. Process for the manufacture of esters of oxy acids which consists in converting the hydroxy acids into the corresponding volatilizable esters and subsequently dehydrogenating the latter in a vaporized state by the action of oxygen in the presence of oxygen compounds which are derived from highly oxidized metals.

12. Process for the manufacture of esters of oxy acids which consists in volatilizing the esters of hydroxy acids and subsequently dehydrogenating the latter by the action of oxygen in the presence of oxides of an acid character which are derived from highly oxidized metals.

13. Process for the manufacture of esters of oxy acids which consists in volatilizing the esters of hydroxy acids and subsequently dehydrogenating the latter by the action of oxygen at temperatures of about 100° C. to about 500° C.

14. Process for the manufacture of esters of oxy acids which consists in volatilizing the esters of hydroxy acids and subsequently dehydrogenating the latter by the action of oxygen at temperatures of about 200° C. to about 400° C.

15. Process for the manufacture of the esters of pyroracemic acid which consists in volatilizing lactic acid ester and subsequently dehydrogenating the vapours by the action of oxygen.

16. Process for the manufacture of esters of keto-compounds which consists in volatilizing the lactic acid esters of alphatic alcohols and subsequently dehydrogenating the vapours by the action of oxygen.

17. Process for the production of aliphatic esters of pyroracemic acid, which consists in volatilizing the lactic acid esters of aliphatic alcohols and subsequently dehydrogenating the same by the action of oxygen at temperatures varying between 250–350° C.

In testimony whereof I affix my signature.

ALFRED HÄUSSLER.